(12) United States Patent
Franzini et al.

(10) Patent No.: US 11,878,788 B2
(45) Date of Patent: Jan. 23, 2024

(54) BRAKE COOLING SYSTEM

(71) Applicant: Goodrich Corporation, Charlotte, NC (US)

(72) Inventors: Giovanni Franzini, Glanmire (IE); Konda Reddy Chevva, Ellington, CT (US); Matthew Robert Pearson, Hartford, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 95 days.

(21) Appl. No.: 17/371,188

(22) Filed: Jul. 9, 2021

(65) Prior Publication Data
US 2022/0009621 A1 Jan. 13, 2022

(30) Foreign Application Priority Data
Jul. 10, 2020 (EP) .................................... 20185291

(51) Int. Cl.
*B64C 25/42* (2006.01)
*B60T 17/22* (2006.01)
*F16D 65/847* (2006.01)
*F16D 66/02* (2006.01)
*F16D 66/00* (2006.01)

(52) U.S. Cl.
CPC .......... *B64C 25/426* (2013.01); *B60T 17/221* (2013.01); *F16D 65/847* (2013.01); *F16D 66/027* (2013.01); *B60T 2270/86* (2013.01); *F16D 2066/001* (2013.01); *F16D 2066/006* (2013.01)

(58) Field of Classification Search
CPC . B64C 25/426; B60T 17/221; B60T 2270/86; F16D 2066/001; F16D 65/847; F16D 66/0027; F16D 2066/006
See application file for complete search history.

(56) References Cited

U.S. PATENT DOCUMENTS

| 8,548,652 | B2 | 10/2013 | Devlieg et al. |
| 10,197,124 | B2 | 2/2019 | Bill |
| 10,336,473 | B2 | 7/2019 | Bill |
| 11,136,145 | B2 * | 10/2021 | Bill ......................... B64C 25/42 |
| 11,407,397 | B2 * | 8/2022 | Georgin .................... B60T 5/00 |
| 2009/0125286 | A1 * | 5/2009 | Waltz .................... F16D 65/847 703/5 |

(Continued)

FOREIGN PATENT DOCUMENTS

| EP | 1712441 A1 | 10/2006 |
| EP | 3530533 A2 | 8/2019 |
| EP | 3530533 A3 | 12/2019 |

OTHER PUBLICATIONS

European Patent No. EP 3048018 to Georgin et al published dated Jul. 27, 2016.*

(Continued)

*Primary Examiner* — Pamela Rodriguez
(74) *Attorney, Agent, or Firm* — CANTOR COLBURN LLP

(57) ABSTRACT

A method of controlling cooling of a brake system, includes determining a brake temperature, obtaining a wear rate profile for the brake system indicative of wear rate in dependence on temperature, and controlling activation of cooling of the brake system according to the wear rate profile.

5 Claims, 3 Drawing Sheets

(56) References Cited

U.S. PATENT DOCUMENTS

2018/0370504 A1   12/2018   Bill et al.
2019/0301554 A1   10/2019   Hosamane et al.

OTHER PUBLICATIONS

Extended European Search Report for International Application No. 20185291.0 dated Dec. 15, 2020, 19 pages.
Guy Di Santo: "Proper Operation of Carbon Brakes", Code 7700, AIRBUS Flight Operations Support—11th Performance and Operations Conference, Aug. 13, 2015, 10 pages.

* cited by examiner

BRAKE COOLING SYSTEM

CROSS REFERENCE TO RELATED APPLICATIONS

This application claims priority to European Patent Application No. 20185291.0 filed July 10, 2020, the entire contents of which is incorporated herein by reference.

TECHNICAL FIELD

This disclosure relates to controlling cooling systems for brakes such as aircraft brakes.

BACKGROUND

Brakes such as in aircraft or other vehicles or machines comprise components that can become hot during use. This heat can cause damage or wear to the brake components and thus affect the effectiveness of the brakes. Cooling systems are known to cool or prevent overheating of the brake components. Conventional cooling systems are controlled e.g. using a simple on/off control such as manual switching on and off of cooling fans by the pilot, or automatically based on the temperature of brake components such as brake discs, so as to keep the components at or below a target temperature. As temperature increases, more cooling is provided.

The wear of brake components, however, especially, but not exclusively, for carbon brakes, is heavily influenced by temperature. As discussed in Guy Di Santo, 'Proper operation of carbon brakes', Proc. of $11^{th}$ Performance and Operation Conference, 2001, however, the relationship between temperature and wear is non-linear and it is not necessarily true that lowering the brake temperature corresponds to a lower brake wear rate. Put another way, lowering temperature could actually lead to an increase in wear. Conventional cooling systems, therefore, may lead to accelerated wear of brake components.

The present disclosure aims to provide control of brake cooling that also minimises wear of the brake components.

SUMMARY

According to a first aspect, the disclosure provides a method of controlling cooling of a brake system, comprising determining a brake temperature, obtaining a wear rate profile for the brake system indicative of wear rate in dependence on temperature, and controlling activation of cooling of the brake system according to the wear rate profile.

The method, in one embodiment, comprises obtaining, from the wear rate profile, a maximum wear rate temperature value being a temperature at which a wear rate of the brake is at a maximum value, comparing the brake temperature with the maximum wear rate temperature value, controlling activation of cooling of the brake depending on the results of the comparison.

In an embodiment, cooling is activated if the brake temperature is less than the maximum wear rate temperature and cooling is not activated if the brake temperature is not less than the maximum wear rate temperature but is less than a predetermined maximum temperature value.

According to a second aspect, the disclosure provides a system for controlling cooling of a brake system, comprising temperature sensing means for determining a brake temperature, means for obtaining a wear rate profile for the brake system indicative of wear rate in dependence on temperature, and a controller for controlling activation of cooling of the brake system according to the wear rate profile.

DETAILED DESCRIPTION

Figure 1:
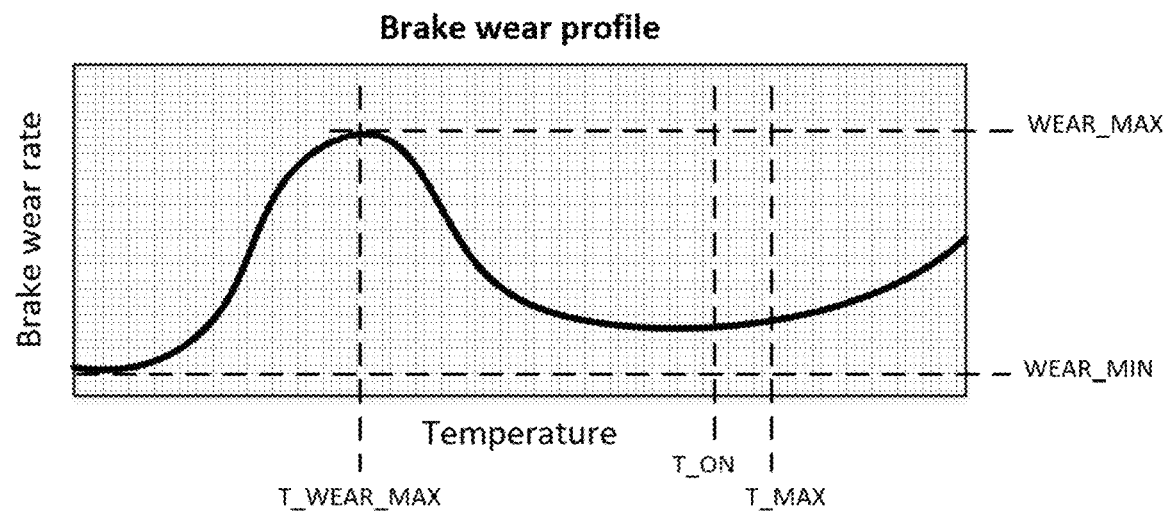
FIG. 1 is a generalised wear rate profile for carbon brakes.

The described embodiments are by way of example only. The scope of this disclosure is limited only by the claims.

As mentioned above, it has been found that the rate of wear of brake components does not vary linearly with temperature. The paper by Guy Di Santo, mentioned above, describes the relationship between wear rate and temperature for aircraft carbon brakes from three different manufacturers. Although each type of brake disk has a different relationship between wear rate and temperature, it can be seen that in all cases, there is a temperature at which the wear rate peaks and, beyond that temperature, wear rate decreases with increasing temperature, at least for a given range of temperature increase. For aircraft brakes, for example, it can be derived, from the Di Santos study, that directly after landing, when the brake temperature can be very high—e.g. in excess of 200° C.—it may not be advisable to cool the brakes as this would move to the left of the graph and have to pass through temperatures where the wear rate is substantially increased before ambient temperature is reached. This would result in significant wear during the taxiing phase.

The present disclosure therefore controls brake cooling taking into account the relationship between brake wear rate and temperature. With the aim of minimizing wear rate whilst keeping temperature below a maximum threshold.

In a simple form, the system and method of this disclosure determines the brake temperature and also uses the temperature for the brake in question at which the maximum wear rate occurs, $T_{-WEAR-MAX}$ as well as the maximum allowed brake temperature $T_{MAX}$. $T_{-WEAR-MAX}$ can be identified from the wear rate profile. $T_{-MAX}$ can be set by the pilot according to departure regulations for safety and/or brake manufacturer suggestions (e.g. based on brake temperature operating range). The brake temperature is compared with $T_{-WEAR-MAX}$ and the cooling is controlled based on the comparison. The cooling system must also be controlled such that the brake temperature does not exceed $T_{MAX}$.

If the brake temperature is below $T_{-WEAR-MAX}$, but is still higher than desired, the brake cooling can be activated to bring the temperature down to a preferred low temperature.

If, on the other hand, the brake temperature is above $T_{-WEAR-MAX}$, the brake cooling should not be activated since reducing the temperature towards $T_{-WEAR-MAX}$ will result in an increase in wear rate.

If, however, the brake temperature is above $T_{-WEAR-MAX}$ but if not activating the cooling system would lead to the temperature reaching $T_{MAX}$, then the cooling should be activated to avoid excessive heating.

Whilst the simplest form of the system controls cooling base on brake temperature, $T_{MAX}$, and $T_{WEAR\_MAX}$, a more accurate control can be provided by taking additional factors into account defining the relationship between wear rate and temperature, and by means of models able to predict the brake temperature evolution. Preferred embodiments will now be described with reference to the drawings.

Considering a single brake assembly equipped with its own active cooling system, where w(T) is the brake wear rate as a function of its temperature T, u is the control variable responsible for regulating the cooling system efficiency/operation, ƒ(T, u, . . . ) is a mathematical model describing the brake temperature evolution as a function of the same, of the cooling system efficiency/operation and of other variables, $T_{max}$ is the maximum allowed brake temperature,

[t, t+$t_{hor}$] is the prediction horizon considered, at each time instant t the method computes u(t) solving the following optimization problem:

$$\min_{u(t)} \int_{t}^{t+t\_hor} w(T(\tau))d\tau$$

$$\text{with } \frac{dT}{dt} = f(T, u, ...)$$

such that $T(\tau) \le T_{max}$, $\tau \in [t, t+t_{hor}]$

If it is not possible to keep the temperature below $T_{max}$, the active cooling system should be controlled such that the brake temperature is kept as low as possible.

As shown from the plots in The Di Santo paper, the wear rate of carbon brakes is characterized by a profile that is similar for all the manufacturers, with a single peak occurring around 200° C. (or around 100° C. for some brake manufacturers). A generalization of carbon brakes wear rate profile is shown in FIG. 1, where the following quantities are shown:

T_WEAR_MAX, the temperature at which the maximum brake wear rate occurs;

T_MAX, the maximum allowed temperature for the brake;

T_ON the temperature above which a cooling system should operate at its maximum efficiency in order to avoid reaching T_MAX.

Figure 2:
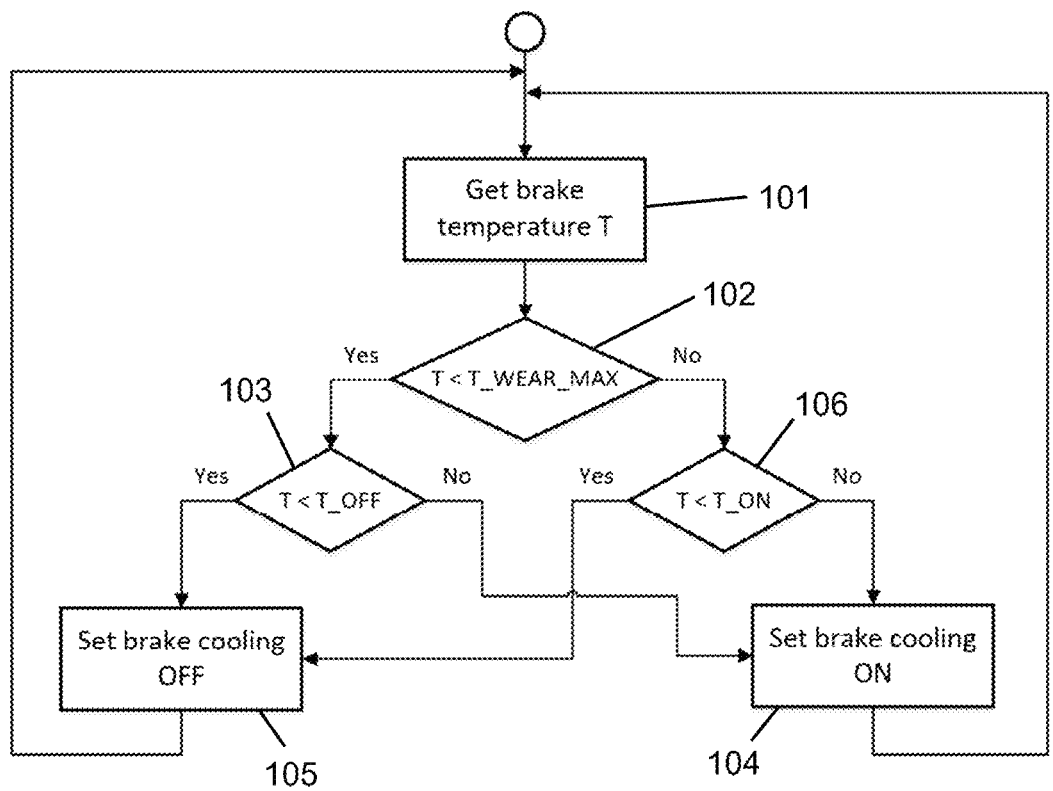
FIG. 2 shows an embodiment of the methodology proposed in this disclosure which considers a typical wear rate profile for carbon brakes.

A simple embodiment of the methodology proposed in this disclosure which considers a typical wear rate profile for carbon brakes is presented in FIG. 2. In this simple embodiment, it is only necessary to know T_WEAR_MAX and either T_MAX or, more preferred, as shown, T_ON.

The temperature T of the brake is determined at 101, using any known temperature measuring means, and/or estimation algorithms.

At 102, the temperature T is compared with T_WEAR_MAX.

If the temperature T is below T_WEAR_MAX (Yes), the cooling can be activated (brake cooling ON). In the embodiment shown in FIG. 2, if the temperature T is below T_WEAR_MAX, it is first determined, at 103, if the temperature T is below T_OFF which is a predetermined temperature threshold at which the cooling system is switched off because the desired temperature has been reached. In an example, this can be set at ambient temperature, although other values can be set. If the temperature is above T_OFF, (No), the brake cooling system is activated or switched on at 104. If the temperature is already below TOFF, the brake cooling is set to OFF at 105. Moving from T_WEAR_MAX to the left of the graph of FIG. 1 reduces wear rate.

If, at 102, it is determined that the temperature T is greater than T_WEAR_MAX, the brake cooling should not be switched on unless T is, or is approaching the maximum permitted temperature T_MAX. This is because, as can be seen in FIG. 1, switching on cooling would move to the left in the graph on FIG. 1 towards the peak T_WEAR_MAX, thus increasing wear rate. In the embodiment shown, if the temperature T is not less than T_WEAR_MAX (No), and is also less than T_ON (106, Yes), then the cooling is set to OFF (105). If, however, T is not less than T_WEAR_MAX but is also not less than T_ON—i.e. is approaching T_MAX, (106, NO), then the cooling should be set to ON to avoid reaching T_MAX.

Preferably, the temperature T continues to be measured, or is measured at periodic intervals, for continuous or regular control of the brake cooling.

In a preferred embodiment, if the wear rate profile of the brake is unknown, this can be learned by processing measurements and information collected by the avionics systems and/or by the brake assembly sensors. The information processed can include brake temperature evolution, readings of the electronic wear pin, applied brake pressure, whether the aircraft was taxiing or landing, etc.

Figure 3:
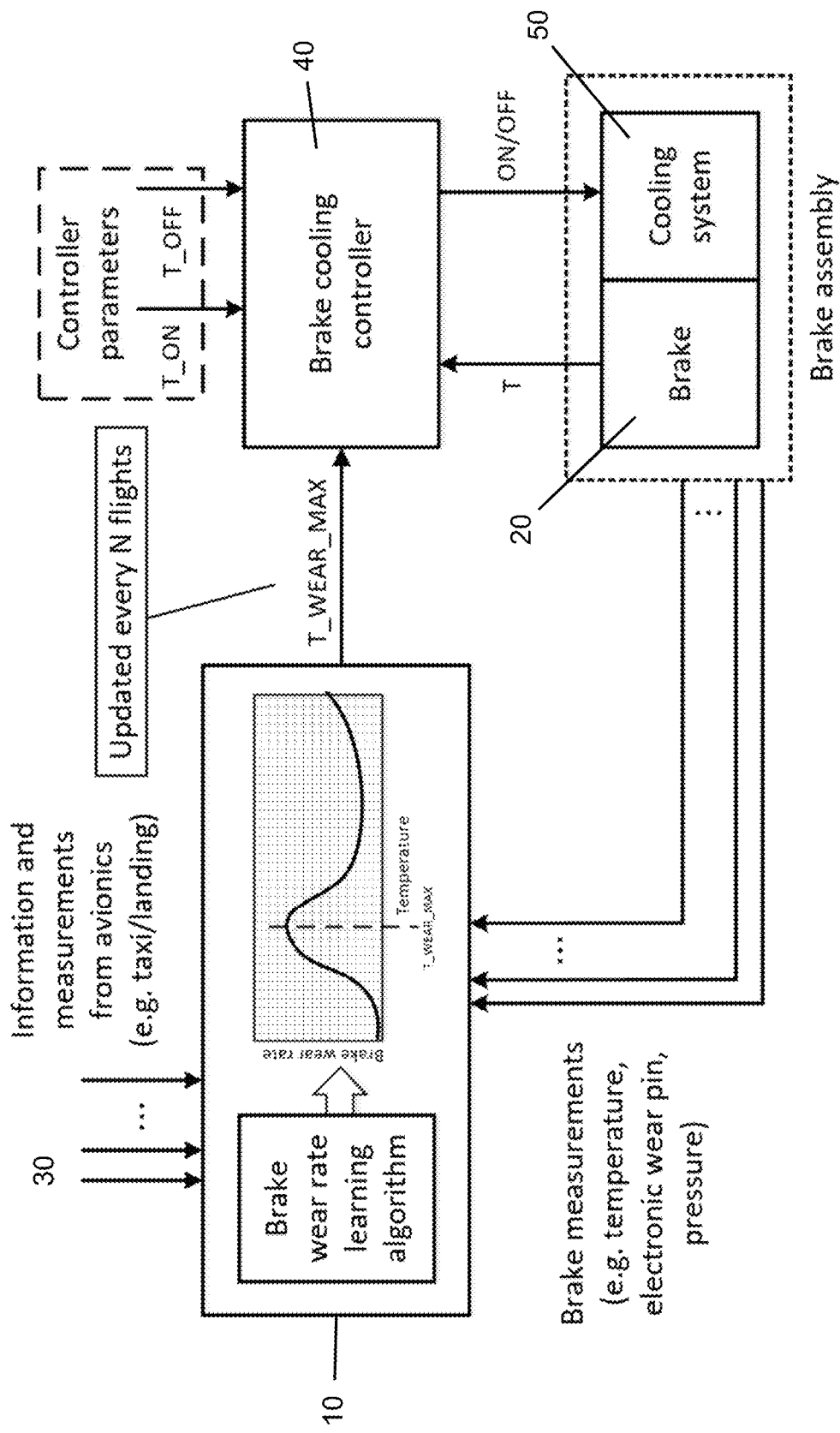
FIG. 3 is a schematic diagram of a system for learning a wear rate
Figure 4:
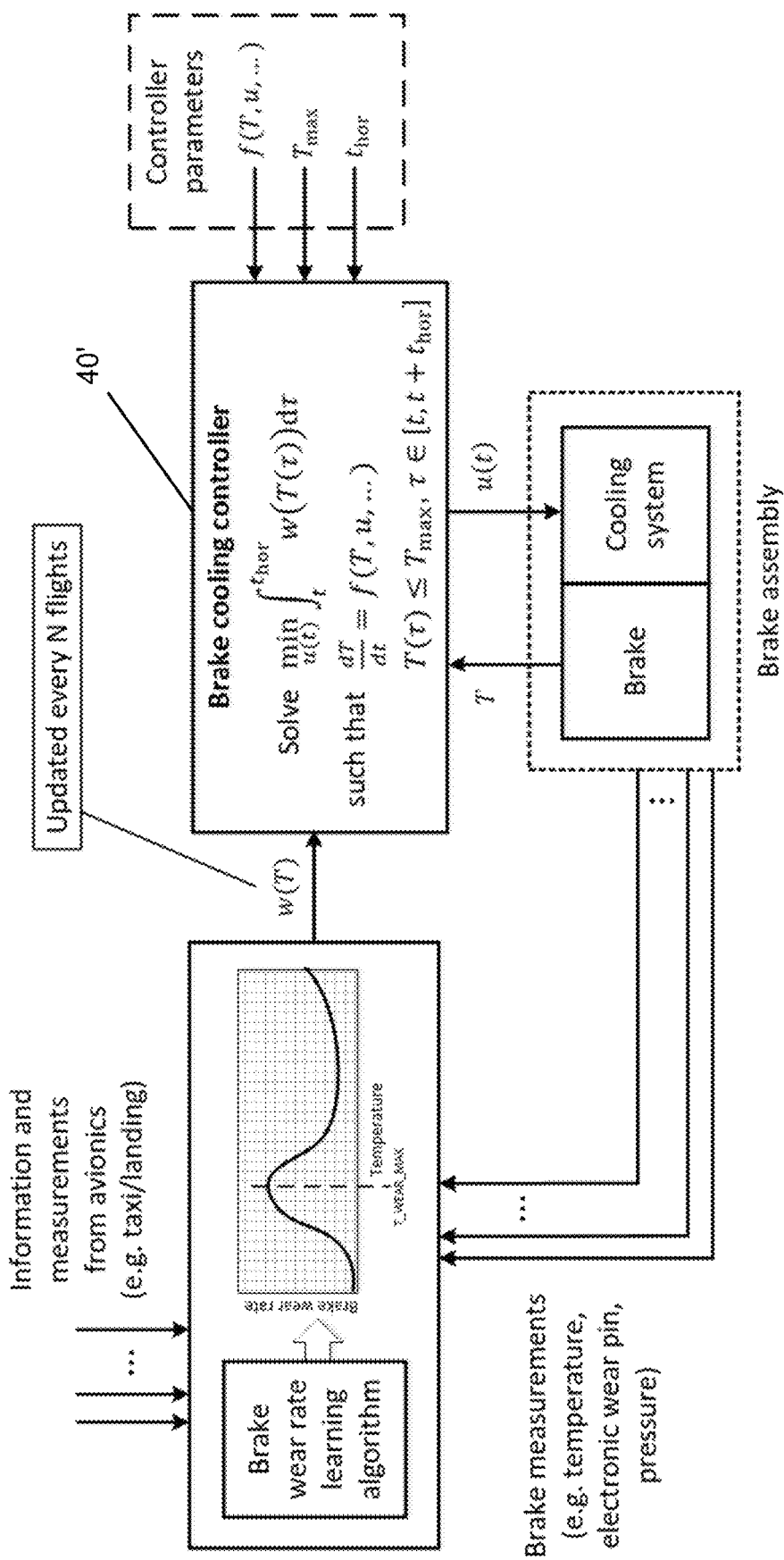
FIG. 4 is a schematic diagram of an alternative system for learning a wear rate profile.

A possible architecture of a brake cooling controller based on a wear rate profile dynamically learned is shown in FIGS. 3 and 4. In this arrangement, a learning algorithm derives a brake wear rate profile processing the data coming from different sources, including, but not limited to, avionics systems and sensors in the brake assembly. The learned wear rate profile is then sent to the brake cooling controller which uses it for controlling the brake cooling system. The brake wear rate profile is updated periodically, for instance every a given number of flights.

The learning algorithm can, in a simple form, shown in FIG. 3, estimate T_WEAR_MAX which can then be used in the simple control described above.

The data and measurements from the various sources are input to a brake wear rate learning algorithm 10. Measurements and data may be provided from the brake itself, 20, (including brake temperature) and/or from other sources such as the avionics systems 30. From the input data and measurements, the algorithm derives T_WEAR_MAX and this value is provided to a brake cooling controller 40, for which control parameters T_ON and T_OFF are already set. Using the estimated T_WEAR_MAX, the brake cooling controller 40 can control operating of the cooling system 50 as described above.

In other embodiments, a more complete wear rate vs. temperature profile can be obtained and used as shown in FIG. 4. This is similar to FIG. 3 except the algorithm calculates a full wear rate/temperature profile which is provided to the brake cooling controller 40'.

Whilst the specific examples above have been for carbon brake disks used in aircraft, the principles of the disclosure can be applied to other types of brakes.

In contrast to the conventional control of brake cooling systems which are based on keeping temperature to the minimum desired temperature, the present disclosure allows the control of the cooling system and, hence, the brake temperature to not only prevent overheating, but also to minimise break wear using a simple algorithm. In its simplest form, the algorithm requires only three parameters.

In addition, with the present disclosure, the cooling system is only activated where needed, thus resulting in energy savings.

In a preferred embodiment, if the brake wear rate profile is unknown, it can be derived by means of learning algorithms processing information collected by brake assembly sensors and by aircraft avionics systems.

The invention claimed is:

1. A method of controlling cooling of a brake system, comprising:
    determining a brake temperature;
    obtaining a wear rate profile for the brake system indicative of wear rate in dependence on temperature; and
    controlling activation of cooling of the brake system according to the wear rate profile;
    wherein the activation of cooling is controlled according to a control variable determined according to the following optimization problem at each time instant t:

$$\min_{u(t)} \int_{t}^{t+t_{-hor}} w(T(\tau))d\tau \text{ with } \frac{dT}{dt} = f(T, u, \ldots)$$

such that $T(\tau) \leq T_{max}$, $\tau \in [t, t+t_{hor}]$
where:
   $w(T)$ is the brake wear rate as a function of its temperature T,
   u is the control variable responsible for regulating the cooling
   $f(T, u, \ldots)$ is a mathematical model describing the brake temperature evolution as a function of the same, of the cooling and of other variables,
   $T_{max}$ is the maximum allowed brake temperature,
   $[t, t+t_{hor}]$ is the prediction horizon considered.

2. The method of claim 1, wherein a maximum temperature threshold beyond which cooling is activated is provided.

3. The method of claim 1, wherein obtaining the wear rate profile comprises obtaining a predetermined wear rate profile.

4. The method of claim 1, wherein obtaining the wear rate profile comprises learning the wear rate profile based on data from the brake system.

5. The method of claim 4, wherein the learning comprises dynamic learning based on data over time.

* * * * *